INVENTORS
JON A. CIOTTI
WILLIAM E. SCHWABE

ATTORNEY

INVENTORS
JON A. CIOTTI
WILLIAM E. SCHWABE

ATTORNEY

INVENTORS
JON A. CIOTTI
WILLIAM E. SCHWABE

BY Frederick J. M'Carter

ATTORNEY

April 16, 1968   W. E. SCHWABE ETAL   3,378,620
ELECTRIC FURNACE CONTROL
Filed March 23, 1965   5 Sheets-Sheet 4

INVENTORS
JON A. CIOTTI
WILLIAM E. SCHWABE
BY
ATTORNEY

INVENTORS
JON A. CIOTTI
WILLIAM E. SCHWABE

ATTORNEY

United States Patent Office 3,378,620
Patented Apr. 16, 1968

3,378,620
ELECTRIC FURNACE CONTROL
William E. Schwabe and Jon A. Ciotti, Niagara Falls, N.Y., assignors to Union Carbide Corporation, a corporation of New York
Filed Mar. 23, 1965, Ser. No. 441,977
5 Claims. (Cl. 13—9)

The present invention relates to electric furnaces. More particularly, the present invention relates to apparatus for use in the control of electric furnaces by the determination of the scrap charge configuration in electric furnaces during melting.

In the melting of steel scrap in three-phase electric furnaces, it has been found that the melting down of the charge is not uniform throughout the furnace, nor can the extent of melting be estimated with a high degree of accuracy. Consequently, certain portions of the furnace, where the charge has melted, are often subjected to very high temperatures for unnecessarily long periods of time and efficient re-charging of the furnace also presents a difficult problem.

It is therefore an object of the present invention to provide apparatus which can determine the configuration of the scrap charge in the furnace during melting whereby the unnecessary exposure of the furnace structure to high temperatures can be avoided and whereby efficient re-charging of the furnace can be readily accomplished.

Other objects of the present invention will be apparent from the following description and claims taken in conjunction with the drawing in which FIGURE 1 shows, somewhat schematically, an electric furnace adapted to melt a charge of steel scrap;

Figure 1:
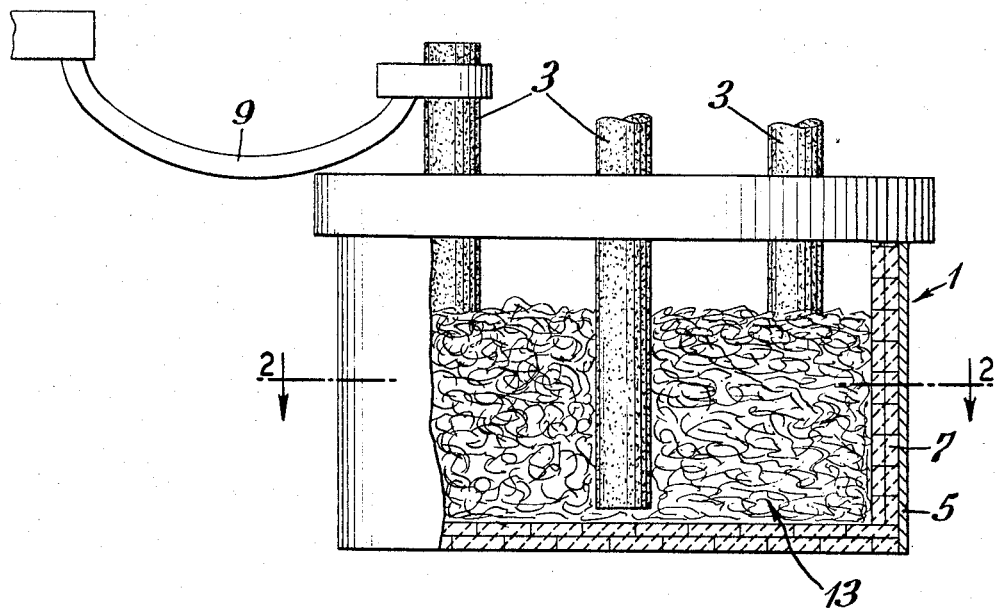
Figure 2:
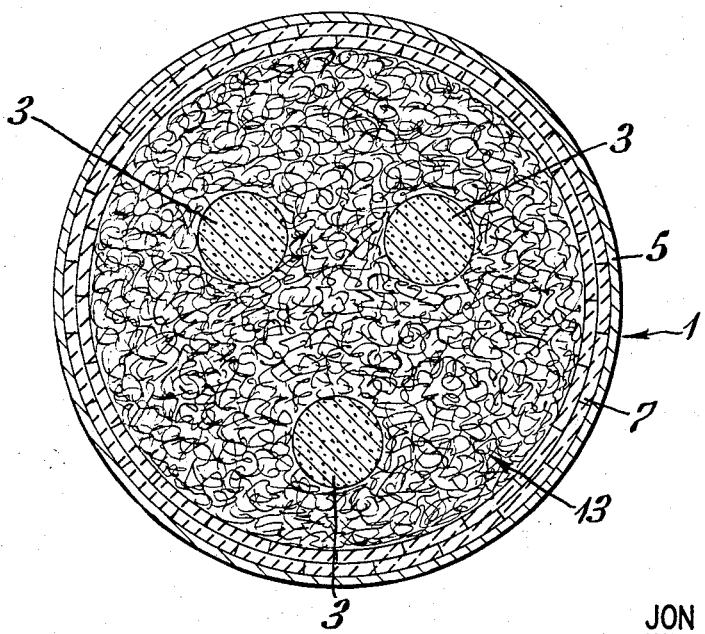
FIGURE 2 is a sectional plan view of the furnace of FIGURE 1.

With reference to the drawing, FIGURES 1 and 2 show, somewhat schematically, an electric furnace indicated at 1 having equidistant electrodes 3 arranged centrally in the furnace. As is customary, the furnace 1 has a shell 5, usually made of carbon steel and a refractory lining indicated at 7. Electric current is supplied from a three-phase transformer (not shown) to the respective electrodes by conductors 9 whereby the steel scrap charge indicated at 13 is progressively melted.

Figure 3:
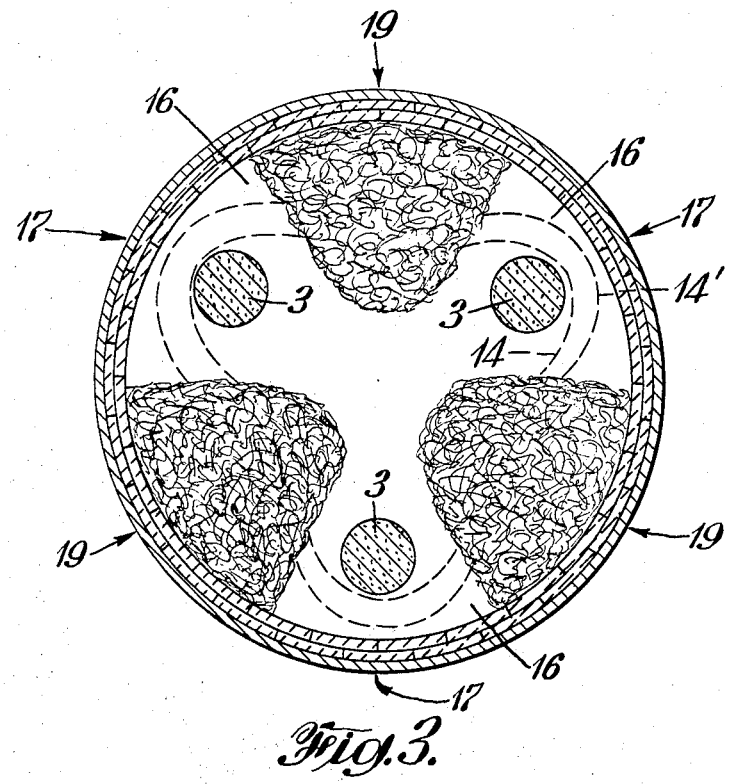
FIGURE 3 is a further sectional plan view showing the scrap charge configuration during melting.
Figure 4:
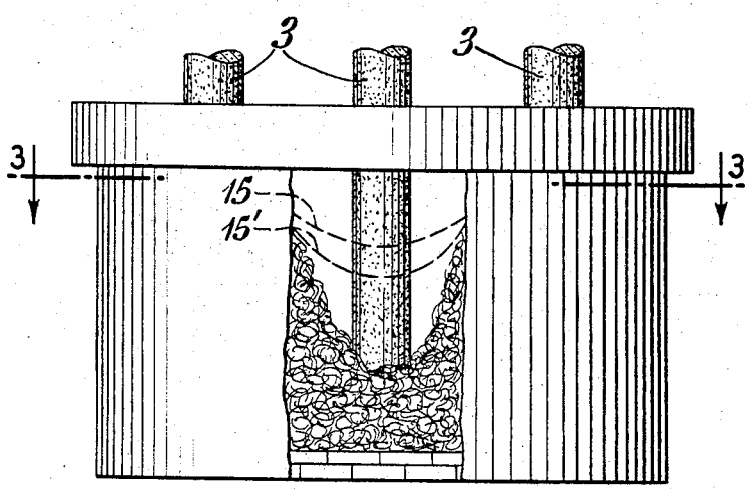
FIGURE 4 is a sectional elevation view corresponding to the arrangement of FIGURE 3.

In operation, the melting of the scrap charge proceeds generally as indicated by the dotted lines 14, 14' etc. in FIGURE 3 and 15, 15' etc. in FIGURE 4, as a result of the heating effect of arcs developed at the electrodes.

As can be seen, the melting of the scrap charge is not uniform throughout the furnace and thus results after a period of time, in the development of voids 16 in the charge and in the presence of "hot" zones and "cold" zones at the furnace lining and shell indicated as 17 and 19 respectively.

Since the voids 16 represent space in which additional charge can be placed, and also represent the extent to which the furnace structure is directly exposed to heat generated by the electrode, it is important to know the configuration of the scrap charge. With such information, it would be possible to efficiently schedule re-charging while at the same time avoiding prolonged exposure of the furnace structure to the direct heat of the electrodes.

Figure 5:
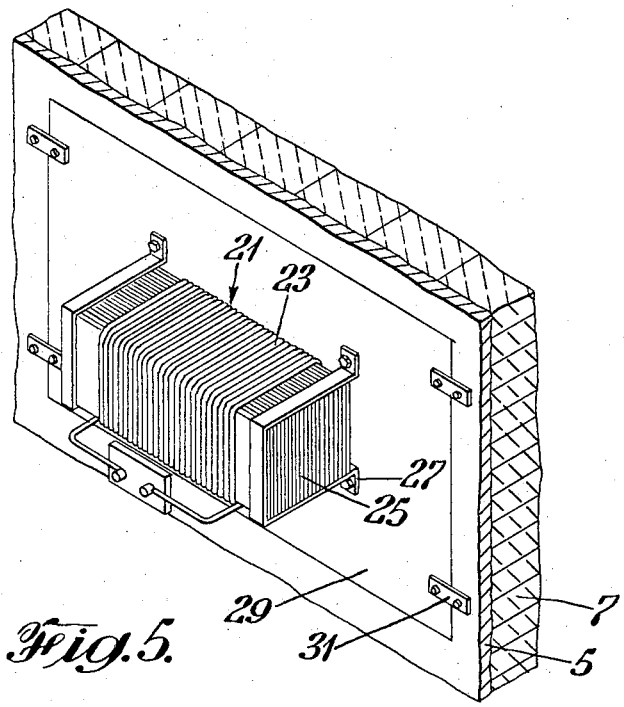
FIGURE 5 shows a pick-up coil detection device suitable for use in the present invention.

In accordance with the present invention, an apparatus is provided for this purpose which comprises the pick-up element indicated as 21 in FIGURE 5. This pick-up coil is essentially an insulated multi-turn coil 23 provided with a laminated iron core 25 and strapped at 27 to plate 29 which is affixed at 31 to the furnace shell 5 and is adjacent the furnace refractory 7. The pick-up coil assembly can be placed directly against the furnace shell 5, however, in order to provide a more effective passage for the electromagnetic flux emanating from within the furnace, the furnace shell is cut-out as indicated in FIGURE 5 and the cut-out portions are replaced by a plate 29 of essentially non-magnetic material such as stainless steel. Alternatively, the pick-up coil can be mounted directly on the refractory in a flux-passage provided by removal of a portion of the steel shell.

During operation of the electric furnace in melting a scrap charge, a strong alternating electromagnetic flux is developed which emanates from within the furnace shell by virtue of the currents flowing in the respective electrodes. Consequently, the pick-up coil 21 mounted as previously described, develops an alternating voltage which is induced by the electromagnetic flux and it has been found that the magnitude of this voltage is related to the amount of scrap in the furnace opposite the pick-up coil. For example, if the pick-up coil is located at a position below the scrap level, before melting has begun, the pick-up will develop a relatively small voltage and, as melting proceeds, and a void develops opposite the pick-up coil, the voltage developed in the pick-up coil increases, reaching a maximum when there is no scrap opposite the pick-up coil.

Figure 6:
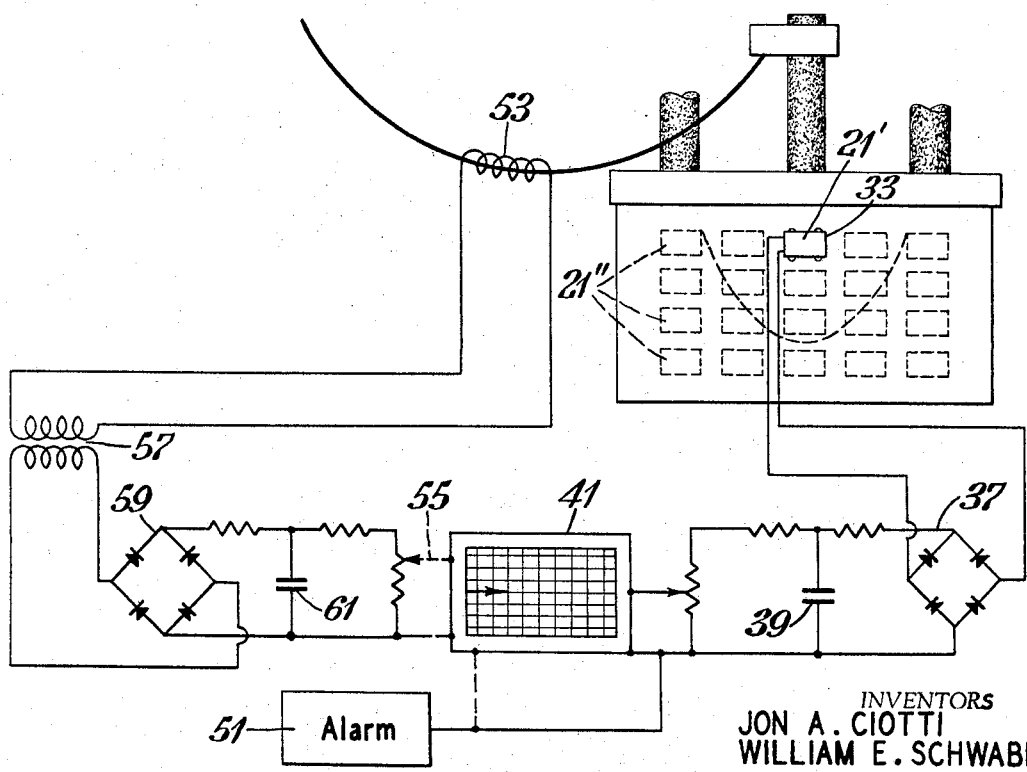
FIGURE 6 shows an arrangement for employing the detection device of FIGURE 5 to determine the scrap level in an electric furnace.

A particular embodiment of the present invention employing the aforedescribed phenomena is shown in FIGURE 6. In FIGURE 6 a pick-up coil is shown at 21' suitably enclosed in a housing 33 which is made of a heat resistant material such as Transite.[1]

With the furnace charged with a scrap to a level above the pick-up coil 21', and with power being supplied to the furnace electrodes, a relatively small alternating voltage is developed in the pick-up coil, rectified at 37, filtered at 39 and applied to a recorder 41, which is suitably of the strip chart type although other indicating devices, including oscilloscopes can be used.

As melting of the charge proceeds, and a void develops opposite the pick-up coil, the voltage in the coil increases and this increase is indicated at the recorder. A maximum voltage occurs when there is no scrap opposite the pick-up coil.

Figure 7:
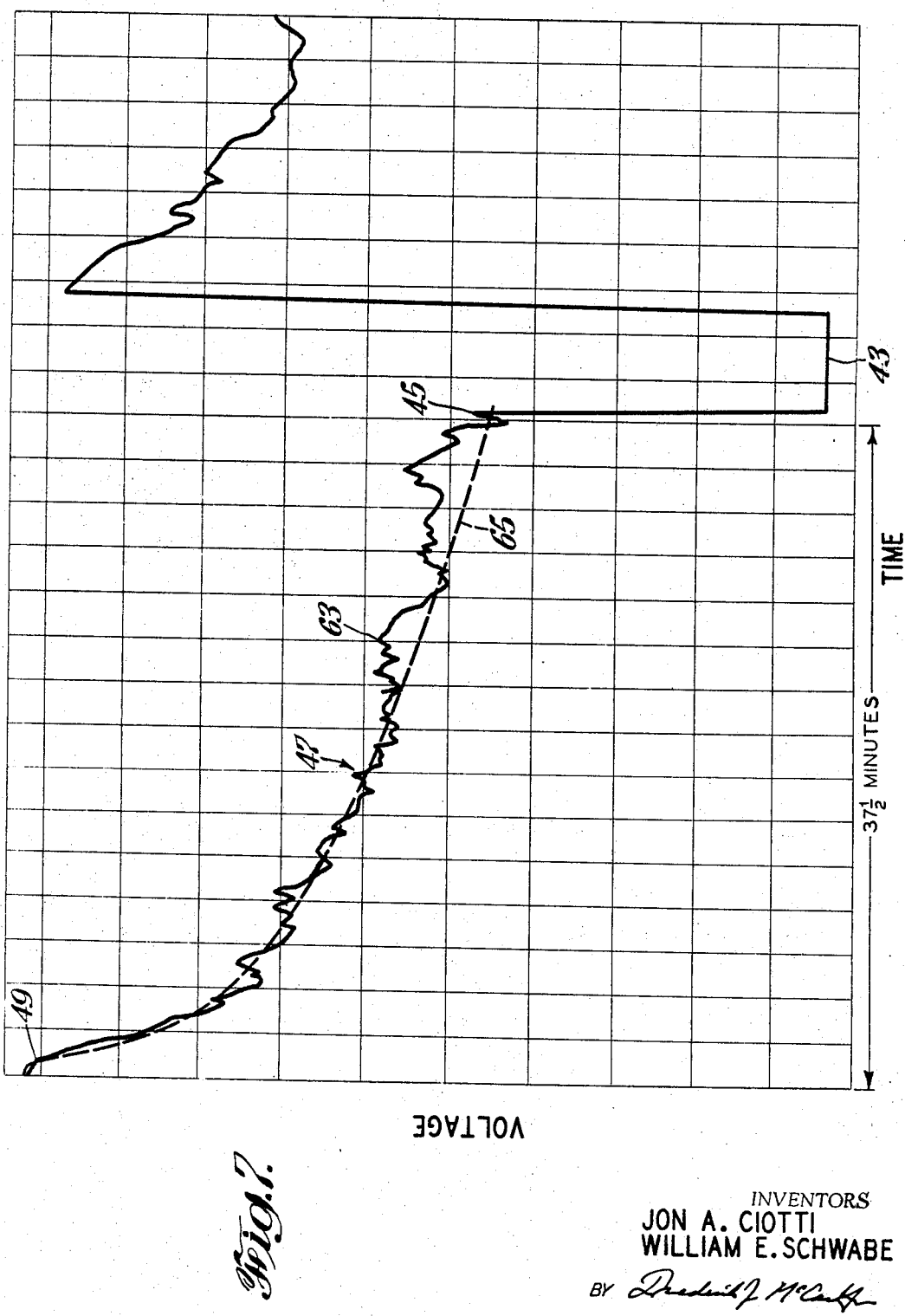
FIGURE 7 is a chart showing the manner in which the output of the detection device of FIGURE 5 varies during melting of scrap in an electric furnace.

Referring now to FIGURE 7, the chart shown therein is the result obtained using an arrangement similar to that previously discussed with respect to FIGURE 6. The portion of the chart indicated at 43 represents the "power-off" condition during which charging of the furnace is accomplished. The portion 45 indicates the condition immediately after "power-on" with the charge level being above the pick-up coil. The portion 47 represents progressive melting of the charge and the development of a void opposite the pick-up coil and the portion 49 shows the maximum voltage developed in the coil indicating that there is essentially no scrap opposite the pick-up coil. At this maximum voltage, or at any lower voltage which continuous operating conditions may show to be practical, ---
[1] Trademark of Johns-Manville Corporation.

an alarm signal can be activated, such as is shown at 51 in FIGURE 6, to notify operating personnel that a quantity of re-charge scrap can be introduced to the furnace. The alarm can be a voltage sensitive buzzer, bell, light or any other suitable arrangement.

In addition, the developed signal can be an electrical signal which is applied to the tap changer for the transformers energizing the electrodes to provide a desired change in applied voltage. Also, the signal can be applied to mechanisms by which the electrodes are raised and lowered whereby the arc at the electrodes can be suitably adjusted.

Moreover, a plurality of pick-up coils 21″ can be employed as indicated in the dotted lines at FIGURE 6 whereby a continuing profile of the scrap charge in the furnace will be indicated. These additional pick-up coils can be connected to provide recorded and alarm signals in the manner indicated for pick-up coil 21′ and the results can be automatically or manually plotted on a model of the furnace.

With further particular reference to FIGURE 6, a current transformer indicated at 53 is coupled to the conductor which supplies current to the electrode, opposite which the pick-up coil 21′ is located. By virtue of this arrangement a voltage 55 is provided at recorder 41 (via isolation transformer 57, rectifier 59 and filter 61) which is proportional to the current flowing in the electrode. Since this current may fluctuate from time to time, it could have the effect of causing an increase or decrease in the voltage developed in pick-up coil 21′, independent of the change in the scrap charge configuration. Such variations are indicated, for example, at 63 in FIGURE 7.

However, by suitably applying the voltage initially derived at current transformer 53 through a ratio detector, voltage divider, or similar arrangement to recorder 41, variations in the voltage developed in pick-up coil 21′, due to changes in electrode current, can be eliminated with the result that the recorder will provide an output approximating that shown in dotted lines 65 in FIGURE 7.

The aforedescribed embodiment can be conveniently implemented using as the recorder a Bristol Recorder 24P12659 modified for ratio recording with a 3/1 Ratio Bridge circuit Model 63A5214. These units are commercially available from the Bristol Company, Waterbury, Conn.

Figure 8:
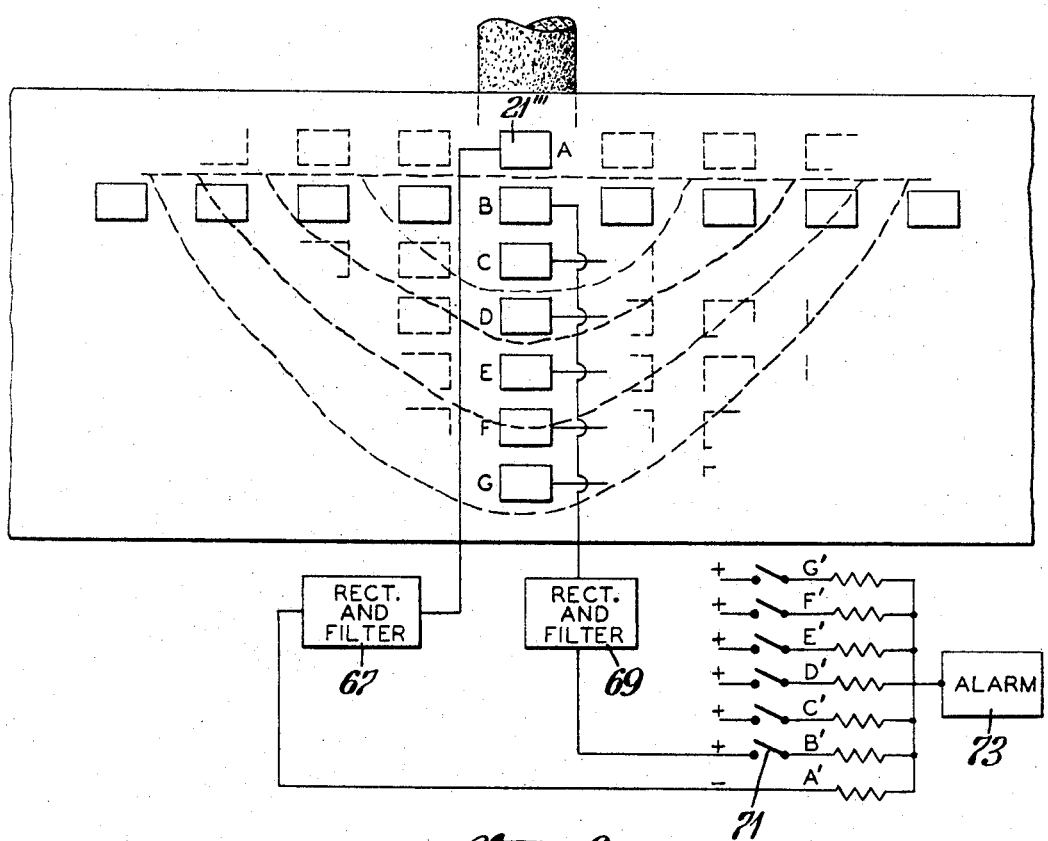
FIGURE 8 shows an embodiment of the present invention suitable for continuously monitoring the scrap charge configuration in an electric furnace and FIGURE 9 shows a further modification of the detection unit illustrated in FIGURE 5.

A further embodiment of the present invention is illustrated schematically in FIGURE 8. In this embodiment an array of pick-up coils 21‴ (or movably adjustable coils) are arranged at section of the furnace shell. By way of example, the pick-up coil array can be arranged opposite one of the electrodes e.g. within an arc of about thirty degrees measured from the center of the electrode configuration. Referring now particularly to the pickup coils designated for convenience as A through G it can be seen that the pick-up coil A is located above the initial scrap level and consequently develops a voltage which will vary as the current varies in the electrode but which will correspond to the maximum voltage that will be developed by the remaining pick-up coils B, C, etc. when there is no scrap opposite these pick-up coils. These other pick-up coils, B, C, etc. will develop lower voltages than the coil A until the scrap has melted to their respective levels and these voltages will also vary as the current varies in the electrode.

By connecting the pick-up coil A through a rectifier and filter shown at 67, which can be of the type previously noted with respect to FIGURE 6, D.C. voltage is applied at resistor A′. Pick-up coil B is similarly connected through filter and rectifier 69 to resistor B′. Thus, with switch 71 closed, and with the polarities of the voltage derived from pick-up coil A and B being opposite as shown, which can be provided merely by selecting the appropriate output lead of the rectifier, the voltages developed at resistors A′ and B′ will add, algebraically.

This will provide a null, or substantially zero voltage output at 73 when the aforesaid voltages are equal in magnitude. Indicator 73 which can be an audio or visual alarm device, is responsive to this null condition and provides an appropriate signal thus notifying operating personnel that there is no scrap opposite pick-up coil A. The pick-up coils C, D, E, F, and G are connected in the same manner as pick-up coil B, through a rectifier and filter, to the corresponding resistors C′, D′, etc. so that indicating signals are provided as the scrap charge reaches the different levels. In the arrangement shown in FIGURE 8, after a signal has been received corresponding to a scrap-level at a given pick-up coil, e.g. coil B, its corresponding switch B is opened and the switch for the next pick-up coil is closed so that an appropriate null is provided when the scrap level reaches this next pick-up coil. This opening and closing of the appropriate switches can be done either manually or automatically. As further shown in FIGURE 8, by the dotted line representation, additional pick-up coils can be suitably located on the furnace shell, and by connecting these in the manner previously described, a complete profile of the scrap charge configuration can be readily obtained.

It is to be understood in connection with the embodiment of FIGURE 8 that other arrangements can be used in place of the "null voltage" circuitry aforedescribed. For example, the voltage applied at resistor A′ can be of the same polarity as that at B′ etc. When an alarm device is provided which is responsive to a predetermined minimium voltage, instead of a "null" voltage, such arrangements being well known to those skilled in the art.

Figure 9:
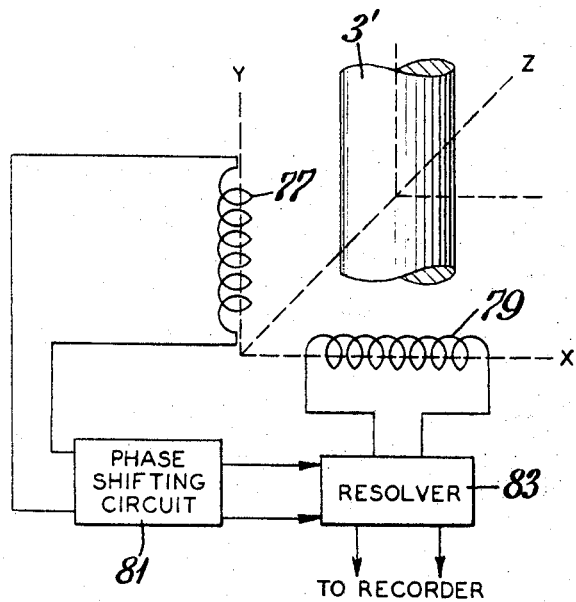

Since at times, the electromagnetic flux which emanates from within the furnace shell is distorted due to the presence of structural members formed of mangetic material, in order to obtain a more sensitive indicator, two or more pick-up coils are used in combination as shown in FIGURE 9. In FIGURE 9, a coil 77 is shown with its axis along the vertical or y-axis and a coil 79 is shown along the horizontal or x-axis with electrode 3′ being shown schematically but without indicating the intervening furnace shell for purposes of clarity. The voltage developed in coil 77 is fed to a phase shifter 81 to provide a shift of 90° and the resulting voltage is fed, together with the voltage from coil 79 to a conventional resolver 83. The output of the resolver is the resultant or vector sum of the voltages applied thereto and more accurately represents the flux than a single coil. A further coil arranged along the z-axis can also be employed, in combination with coils 77 and 79, to provide a still more accurate indication of the flux emanating from the furnace. In any event, the resultant voltage obtained from the resolver 83 is applied, through appropriate rectification and filtering circuitry to a recorder or signalling device in the manner heretofore described.

What is claimed is:

1. Apparatus for determining the scrap charge configuration during melting of the charge in a three-phase electric furnace having three vertical electrodes arranged substantially centrally and equidistant within a furnace shell, said apparatus comprising:
    (i) coil means arranged adjacent a non-magnetic portion of the electric furnace shell at a predetermined location whereby electromagnetic flux emanating from within the electric furance shell causes a voltage to be induced in the coil means and
    (ii) means connected to the coil means for measuring any change in the voltage induced in the coil means during melting of the scrap charge in the furnace.

2. Apparatus for determining the scrap charge configuration during melting of the charge in a three-phase electric furnace having three vertical electrodes arranged substantially centrally and equidistant within a furnace shell said apparatus comprising:

(i) coil means arranged adjacent a non-magnetic portion of the electric furnace shell at a predetermined location whereby flux emanating from within the furnace shell causes a voltage to be induced in said coil means (ii) means connected to the coil means for measuring any change in the voltage induced in the coil means during melting of the scrap charge in the furnace and (iii) means for providing a signal when the voltage induced in said coil means reaches a predetermined value.

3. Apparatus in accordance with claim 1 wherein the portion of the furnace shell opposite the coil means is formed of an essentially non-magnetic material.

4. Apparatus for determining the scrap charge configuration during melting of the charge in a three-phase electric furnace having three vertical electrodes arranged substantially centrally and equidistant within a furance shell said apparatus comprising:

(i) first coil means arranged adjacent a non-magnetic portion of the furnace shell at a location above the highest level of the scrap charge within the furnace whereby electromagnetic flux emanating from within the electric furnace shell causes a voltage to be induced in said first coil means (ii) second coil means arranged adjacent a non-magnetic portion of the furnace shell at a predetermined location below the highest level of the scrap charge within the furnace whereby electromagnetic flux emanating from within the electric furnace shell causes a voltage to be induced in said coil means.

(iii) means for combining the voltages induced in said first and second coil means and (iv) means for providing a signal when the sum of the combined voltages reaches a predetermined value.

5. Apparatus for determining the scrap charge configuration during melting of the charge in a three-phase electric furnace having three vertical electrodes supplied with electric current by means of separate conductors and being arranged substantially centrally and equidistant within a furnace shell said apparatus comprising:

(i) coil means arranged adjacent a non-magnetic portion of the electric furnace shell at a predetermined location substantially opposite one said furnace electrode whereby electromagnetic flux emanating from within the electric furnace shell causes a voltage to be induced in said coil means (ii) current transformer means electromagnetically coupled to the conductor carrying current to the furnace electrode opposite said coil means to develop a voltage in said current transformer means proportional to the current being supplied to said electrode (iii) means for combining the voltage induced in said coil means with the voltage developed in said current transformer means to provide a resultant voltage which is substantially unaffected by variations in the current supplied to said electrode and (iv) means for measuring any variation in said combined voltage during melting of the scrap charge.

References Cited
UNITED STATES PATENTS

| | | | |
|---|---|---|---|
| 1,832,128 | 11/1931 | Klopsteg | 324—43 |
| 2,053,938 | 9/1936 | Barker | 340—244 |
| 2,331,617 | 10/1943 | Moore | 324—43 X |
| 2,585,607 | 2/1952 | Whitmore et al. | 340—244 X |
| 3,258,968 | 7/1966 | Woodcock | 240—244 X |
| 3,133,191 | 5/1964 | Stone et al. | 250—43.5 |

BERNARD A. GILHEANY, *Primary Examiner.*

H. B. GILSON, *Assistant Examiner.*